United States Patent [19]
Mehta

[11] 4,247,991
[45] Feb. 3, 1981

[54] INDUSTRIAL DRYING

[75] Inventor: Gurmukh D. Mehta, Warrenton, Va.

[73] Assignee: InterTechnology/Solar Corporation, Warrenton, Va.

[21] Appl. No.: 81,001

[22] Filed: Oct. 1, 1979

[51] Int. Cl.³ .............................................. F26B 3/04
[52] U.S. Cl. ................................................. 34/35; 34/80; 34/86; 62/93; 62/94; 62/95; 165/DIG. 2
[58] Field of Search ................... 34/35, 86, 80; 62/91, 62/92, 93, 94, 95, 271; 165/DIG. 2, DIG. 12

[56] References Cited
U.S. PATENT DOCUMENTS

| | | | |
|---|---|---|---|
| 2,137,347 | 11/1938 | Olsson | 34/35 |
| 3,376,652 | 4/1968 | Hernandez, Jr. | 62/92 |
| 3,401,530 | 9/1968 | Meckler | 62/271 |
| 3,621,585 | 11/1971 | Robertson | 34/80 |
| 3,728,074 | 4/1973 | Victor | 34/80 |

*Primary Examiner*—Larry I. Schwartz
*Attorney, Agent, or Firm*—John T. Roberts

[57] ABSTRACT

A gas drying system where the heat energy in the exhaust gas and the dried product is recovered to reduce the energy required to dry additional products.

2 Claims, 3 Drawing Figures

INDUSTRIAL DRYING

FIELD OF INVENTION

This invention relates to industrial gas drying. A damp product is fed into a drying chamber. A heated gas stream of low humidity is also fed in, concurrently or countercurrently, and the moisture in the product is transferred to the gas.

When the product enters the chamber as a liquid or slurry, it may be sprayed from the top of a drying tower. The gas enters the bottom and rises through the falling product which may leave the chamber as a concentrated liquid or as a solid.

When the product is damp particulate matter, the drying chamber may be a fluidized bed which is an elongated chamber, separated into an upper and lower compartment by a screen through which the gas may pass but not the product. The gas is introduced into the lower chamber, passes upwardly and is removed from the upper chamber. The product, introduced at one end of the upper chamber, flows toward the other end, under the influence of the rising gas stream.

There are many types of products dried by these systems. Among them are detergents, foods such as milk and coffee, and powders.

DESCRIPTION OF PRIOR ART

The simplest form of conventional gas drying simply heats air prior to its introduction into the chamber. The heating means is usually the burning of fossil fuels. Depending upon application, the inlet temperature will be 300° to 1500° F.

Heat recovery from the exhaust gas is known. U.S. Pat. No. 2,933,826 discloses a paper making machine where moisture is removed from the paper slurry and heat is recovered from the air-vapor exhaust stream. Water first sparges the vapor and a heat exchanger transfers the heat from the hot water to sub-atmospheric steam which is compressed in a heat pump cycle for reintroduction to the paper slurry.

Desiccant beds are also known, as disclosed in the commonly assigned patent application Ser. No. 065,380 filed Aug. 9, 1979, entitled Desiccant Air Conditioning System.

SUMMARY OF INVENTION

A gas drying system is disclosed which recovers the heat energy from the dried product and from the exhaust air. It further recovers heat from dehumidifying the exhaust air. All of the recovered heat energy is used to raise the temperature of the drying air entering the drying chamber.

DESCRIPTION AND MODE OF OPERATION

Figure 1:
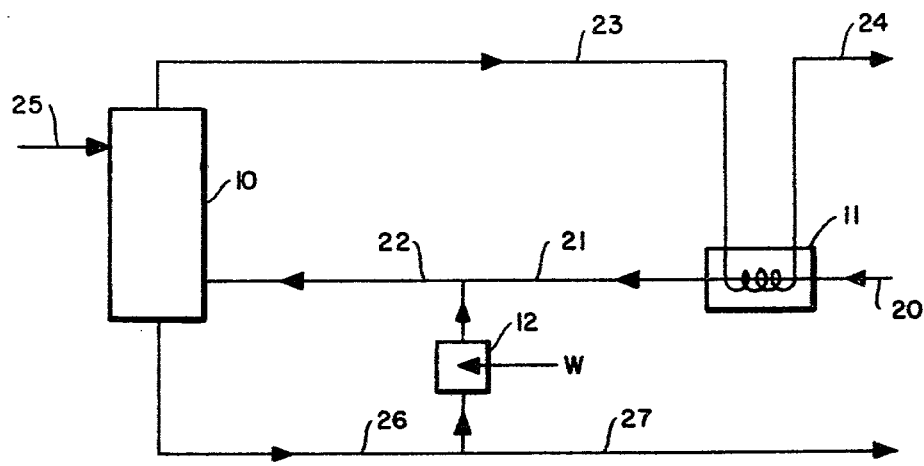
FIG. 1 is a schematic drawing of a heat recovery system within the scope of the present invention.

The drying system of FIG. 1 discloses three active elements, the chamber 10, the heat exchanger 11, and the heat pump 12. The product enters the chamber at 25 and exits at 26 and is then cooled by heat pump 12. Outside air enters at 20, is heated by heat exchanger 11, exits in pipe 21, is further heated by heat pump 12 and enters drying chamber 10 where it picks up moisture, leaves in pipe 23 and releases some of its heat in heat exchanger 11 before exhausting in pipe 24.

This system, as compared with a conventional dryer, produces only a warm, as opposed to hot, dried product and further exhausts warm, as opposed to hot, air. For illustration purposes, the following data, which is typical for various detergents, coffee and many other products, have been assumed:

Air flow rate = 1 lb/min
Specific heat of air = 0.24 BTU/lb° F.,
Outdoor air temperature = 85° F.,
Air inlet temperature to drying chamber = 400° F.,
Air exit temperature from drying chamber = 200° F.,
Product exit temperature from drying chamber = 300° F.

The product flow rate is so assumed that its thermal capacity (product of mass flow rate and specific heat) is equal to that for air; 0.24 BTU/min° F.

With this data, while the conventional drier requires 76 BTU/min to heat the air, the system shown in FIG. 1, under the same conditions, requires a total work input of about 6.5 BTU/min only to drive the heat pump.

The operating conditions for this system, with a 5° F. differential for heat exchangers and the Carnot limit for the heat pump are:

| Ref. No. | Temp °F. |
|---|---|
| 20 | 85 |
| 21 | 195 |
| 22 | 400 |
| 23 | 200 |
| 24 | 90 |
| 26 | 300 |
| 27 | 109 |

Figure 2:
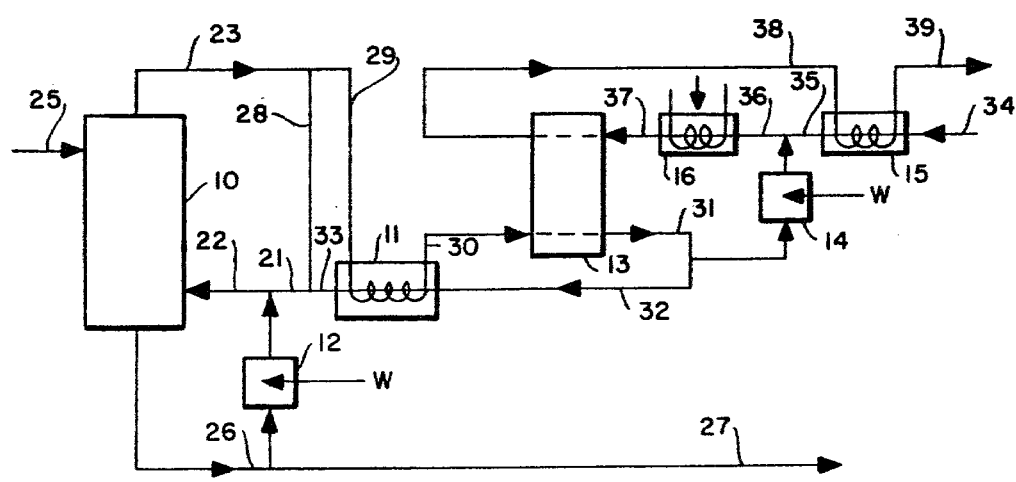
FIG. 2 is a schematic drawing of a heat recovery system similar to that disclosed in FIG. 1 and with the addition of a desiccant bed.

An improved, more efficient system is shown in FIG. 2. Like the system in FIG. 1, the hot dried product exits in pipe 26 and is cooled by heat pump 12, and leaves from pipe 27. Likewise, the hot dried air 21 is further heated by heat pump 12 before entering through pipe 22 into drying chamber 10 and leaving through pipe 23. The remainder of the system differs.

Pipe 23 is split in two, pipe 28 conducting a fraction of the exhaust air from the chamber without any change in its temperature or humidity, and pipe 29 conducting the remainder of the exhaust air first to heat exchanger 11. From there it goes in pipe 30 to desiccant bed 13, to remove moisture. During this process the air stream is heated due to the release of heat of absorption. Next, in pipe 31, it goes to heat pump 14, which removes the heat of moisture absorption for the recovery section of the desiccant bed 13. After this, the air passes, in pipe 32, through heat exchanger 11, is heated and leaves in pipe 33 to be mixed with the air in pipe 28.

The recovery section of the desiccant recovery system draws outside air in pipe 34 which is passed through heat exchanger 15 to pipe 35 where it is further heated by heat pump 14, exiting at pipe 36. Additional energy is supplied by heating coil 16, if needed, and the heated air enters the recovery secion of the desiccant bed through pipe 37. Following that, the air passes in pipe 38 through heat exchanger 15 into pipe 39, to exhaust.

A particular advantage of this system is that a gas, other than air, may be used in the drying cycle, since it is a closed loop. The desiccant bed could still be regenerated with air since there is no gas mixing between the processing and recovery sections.

Figure 3:
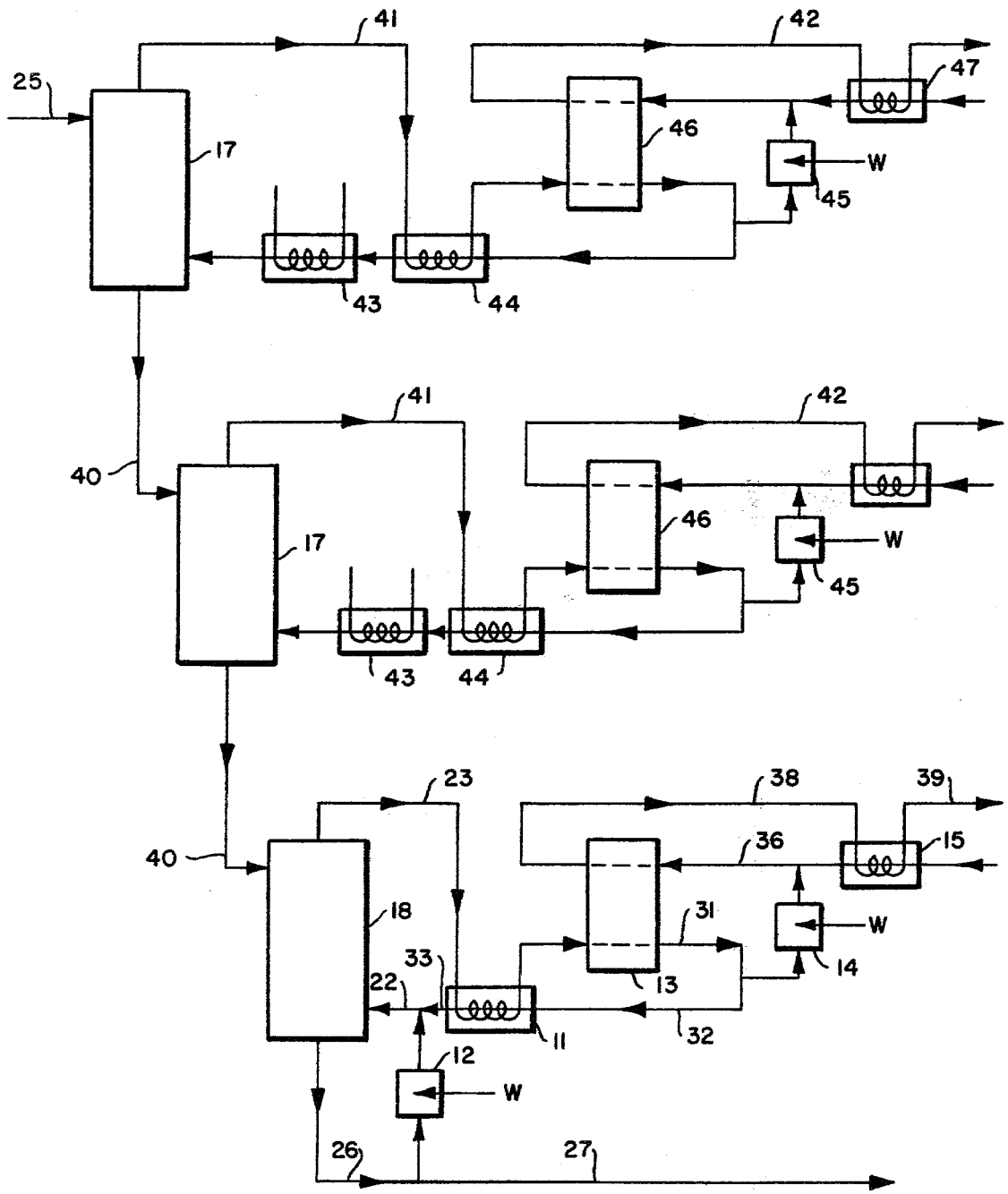
FIG. 3 is a drawing of a multistage system employing the elements of the present invention.

FIG. 3 discloses a multistage drying system, each component of which is similar to FIG. 2. The first two stages are identical, except for the operating conditions, the elements are commonly numbered. The third stage is virtually the same as that disclosed in FIG. 2 and the elements bear the same numbers.

The gas drying chambers 17, 17 and 18 are shown separated. Actually they may be three zones of a single chamber 10 and the pipes 40 merely the joints between the zones. The wet product enters at 25 and leaves at 26.

In the first two zones drying gas circulates in pipe 41. After leaving chamber 17 it passes through heat exchanger 44 which cools it, desiccant bed 46 which drys and warms it, heat pump 45 which cools it and back through heat exchanger 44 which warms it, and heating coil 43 which further heats it before entering chamber 17. A particular advantage of multistages is that the air tempreature may be kept lower, thus allowing the product temperature to stay lower. This improves the product quality of many heat sensitive products such as certain foods and pharmaceuticals.

The multistage system has been disclosed with three stages, for example only. Any number of stages may be employed, reducing the temperature differential with each additional stage.

Although the present invention has been described with reference to a particular embodiment thereof, it should be understood that those skilled in the art may make many other modifications and embodiments thereof which will fall within the spirit and scope of the principles of this invention.

What is claimed as new and desired to be secured by patent of the United States is:

1. In a method for drying a product by mixing it in a chamber with a heated dry gas the improvement comprising:
    (a) introducing said product into a drying chamber;
    (b) flowing a stream of gas across the product to vaporize and remove moisture;
    (c) removing heat from said product after drying by a first heat pump;
    (d) circulating said gas through a heat exchanger to cool it;
    (e) further circulating said gas to a desiccant bed to dry it;
    (f) further circulating said gas to a second heat pump to cool it;
    (g) further circulating said gas to said heat exchanger to heat it;
    (h) heating said gas with the heat from said first heat pump;
    (i) reintroducing said gas into said drying chamber;
    (j) heating outside air with the heat produced by said second heat pump;
    (k) introducing said heated outside air to said desiccant bed in the recovery section to remove moisture;
    (l) circulating the air exiting said recovery section in heat exchanging contact with said outside air to heat it.
2. The method of claim 1 in which said product exiting said drying stage is further dried in one or more processes containing the same steps.

* * * * *